United States Patent
Verbrugge et al.

(10) Patent No.: US 9,033,398 B2
(45) Date of Patent: May 19, 2015

(54) MULTI-THICKNESS TUBE FOR HYDROFORMED MEMBERS

(75) Inventors: Mark W. Verbrugge, Troy, MI (US); Anil K. Sachdev, Rochester Hills, MI (US); Robert R. Mayer, Clio, MI (US); Richard M. Kleber, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 207 days.

(21) Appl. No.: 12/748,661

(22) Filed: Mar. 29, 2010

(65) Prior Publication Data

US 2011/0233961 A1    Sep. 29, 2011

(51) Int. Cl.

| | |
|---|---|
| *B62D 21/15* | (2006.01) |
| *B21C 37/16* | (2006.01) |
| *B21C 23/08* | (2006.01) |
| *B21C 25/08* | (2006.01) |
| *B21D 26/057* | (2011.01) |
| *B62D 29/00* | (2006.01) |
| *B62D 25/00* | (2006.01) |
| *B62D 21/11* | (2006.01) |
| *B60R 19/18* | (2006.01) |

(52) U.S. Cl.
CPC ............... *B21C 37/16* (2013.01); *B21C 23/085* (2013.01); *B21C 25/08* (2013.01); *B21D 26/057* (2013.01); *B62D 21/11* (2013.01); *B62D 21/152* (2013.01); *B62D 29/008* (2013.01); *B60R 2019/182* (2013.01); *B60R 19/18* (2013.01)

(58) Field of Classification Search
USPC ................... 296/187.03; 72/54; 428/34.1, 600
See application file for complete search history.

(56) References Cited

U.S. PATENT DOCUMENTS

| | | | |
|---|---|---|---|
| 5,339,670 A * | 8/1994 | Granelli | ............................ 72/152 |
| 5,491,883 A | 2/1996 | Marlinga | |
| 6,183,013 B1 | 2/2001 | Mackenzie et al. | |
| 6,585,331 B2 | 7/2003 | Varela | |
| 6,842,957 B2 | 1/2005 | Van Giezen | |
| 6,845,552 B2 | 1/2005 | Blough | |
| 2003/0159289 A1 | 8/2003 | Van Giezen | |
| 2003/0192185 A1 | 10/2003 | Varela | |
| 2004/0245321 A1 * | 12/2004 | Spitz | ........................... 228/173.6 |
| 2006/0108837 A1 * | 5/2006 | Deme et al. | .............. 296/203.02 |
| 2006/0130307 A1 | 6/2006 | Lo | |
| 2006/0201227 A1 * | 9/2006 | Lepre et al. | ................. 72/370.14 |
| 2008/0007088 A1 * | 1/2008 | Newport | ................... 296/187.03 |

* cited by examiner

*Primary Examiner* — Glenn Dayoan
*Assistant Examiner* — Melissa A Black
(74) *Attorney, Agent, or Firm* — BrooksGroup

(57) ABSTRACT

One embodiment includes providing a contiguous tubular member including at least one of a first material or a second material, so that the tubular member has a wall thickness that varies along the length of the tubular member; bending the tubular member; and hydroforming the tubular member into a part.

29 Claims, 2 Drawing Sheets

MULTI-THICKNESS TUBE FOR HYDROFORMED MEMBERS

TECHNICAL FIELD

The field to which the disclosure generally relates includes tubes of variable wall thickness for hydroformed parts and methods of making thereof.

BACKGROUND

It is known in the art to form a structural part by joining various formed pieces, various hydroformed tubular pieces, or a combination of castings, extrusions, and other pieces.

SUMMARY OF EXEMPLARY EMBODIMENTS OF THE INVENTION

One embodiment includes providing a contiguous tubular member including at least one of a first material or a second material, so that the tubular member has a wall thickness that varies along the length of the tubular member; bending the tubular member; and hydroforming the tubular member into a part.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

One embodiment includes a method of making a contiguous tube having a wall thickness that varies along the length of the tubular member, and having no joints that are generally parallel to the length of the tube. The contiguous tube may be constructed of one or more metals, for example but not limited to, aluminum, magnesium, titanium, steel, alloys thereof, or any combination of these metals. The contiguous tube may be used to make structural parts, for example but not limited to, hydroformed parts.

Figure 1:
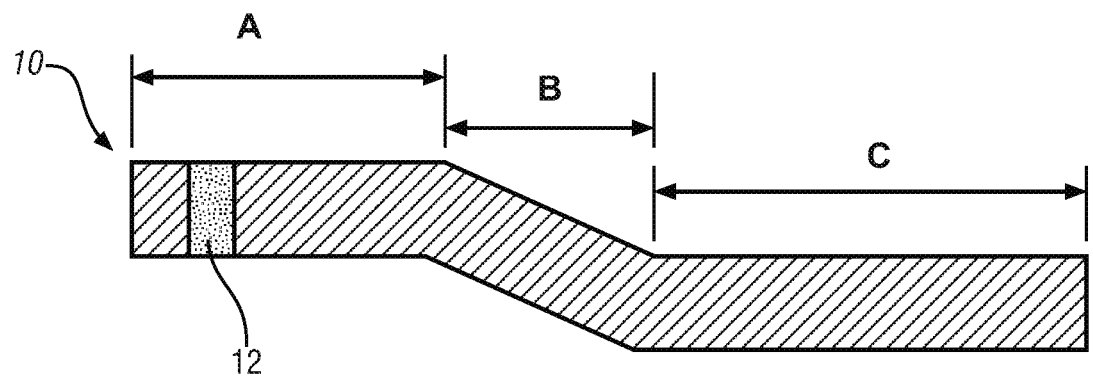
FIG. 1 illustrates a product according to one embodiment of the invention.

Referring to FIG. 1, in one embodiment, a method includes producing a tubular member 10 so that it has a wall thickness that varies along the axial length of the tubular member. The wall thickness may be dictated by the desired use for a final part made using the tubular member 10. For example, the wall may be thicker in a portion of the tubular member 10 where strength and/or stiffness is needed. Or the wall may be thicker in a portion of the tubular member 10 where superior mechanical performance is desired. By varying the thickness along the tubular member 10, the overall mass of the tubular member 10 for a particular application may be decreased. In one embodiment, the wall thickness of the tubular member 10 may range, for example but not limited to, from about 1 mm to about 10 mm. The minimum internal diameter of the tubular member 10 may range from about 4 mm to about 300 mm.

In one embodiment, the method may include forming a crush initiator 12 in the tubular member 10, shown in FIG. 1. The crush initiator 12 may be a region of the tubular member wherein the wall is thinner than the walls of the adjacent regions. For example, the thickness of the walls in the crush initiator region 12 may be about 90% to about 98% of the thickness of the walls in the adjacent regions.

The tubular member 10 may include at least one of a first material or a second material. At least one of the first material or the second material may include aluminum, magnesium, steel, titanium, or alloys thereof. The first material may be galvanically isolated by the second material. Referring to FIG. 1, for example, region A of the tubular member 10 may include aluminum, region B may include magnesium, and region C may include aluminum. In other embodiments, the tubular member 10 may include more than two different materials in the proper sequence to minimize galvanic corrosion. For example, steel preferably would not be placed near magnesium.

In various embodiments, the tubular member 10 having no joints generally parallel to the length of the tubular member may be produced by one of a variety of processes. In one embodiment, the tubular member 10 may be produced by tube spinning. Tube spinning may include providing a blank or preform containing the amount of material necessary to form the tubular member by taking into account the metal that will be moved to create the varying wall thickness. In one embodiment, the blank may include a tailor welded tubular metal blank including at least one of the first material or the second material. The tailor welded tubular metal blank may be formed by joining at least a first portion and a second portion of the tubular blanks by laser welding or any other suitable joining method known in the art. The blank or preform may be spun against a mandrel to produce a tubular member of the desired shape.

In another embodiment, the tubular member 10 may be produced by extrusion with a movable mandrel or a reciprocating movable mandrel. Extrusion may include pushing a solid billet including at least one of the first material or the second material through a die of the desired cross sectional shape. A mandrel internal to the die may create the inner surface of the tubular member 10, and the outer die may create the outer surface of the tubular member 10. The mandrel may be movable, for example by being mounted hydraulically, in a periodic fashion to achieve a variable wall thickness in the tubular member 10. Extrusion processing of metals such as, but not limited to, aluminum or magnesium, may result in a strong bond without heat distortion or heat affected zones.

In another embodiment, the tubular member may be produced by providing a sheet having a thickness that varies, where the sheet comprises at least one of the first material or the second material, roll forming the sheet into a tube-like structure having a seam or interface parallel to the length of the tube, and seam welding the tube-like structure to form the tubular member 10. Seam welding may include a process of solid-state joining, for example but not limited to, induction welding, friction stir welding, or laser welding. Induction welding may include using electromagnetic induction to heat the seam of the tube-like structure. Friction stir welding may include rotating a tool along the seam to create a weld by the action of both frictional heating and mechanical deformation due to the rotating tool. Laser welding may include using a very localized heat source of a laser to weld the seam of the tube-like structure.

Figure 2:
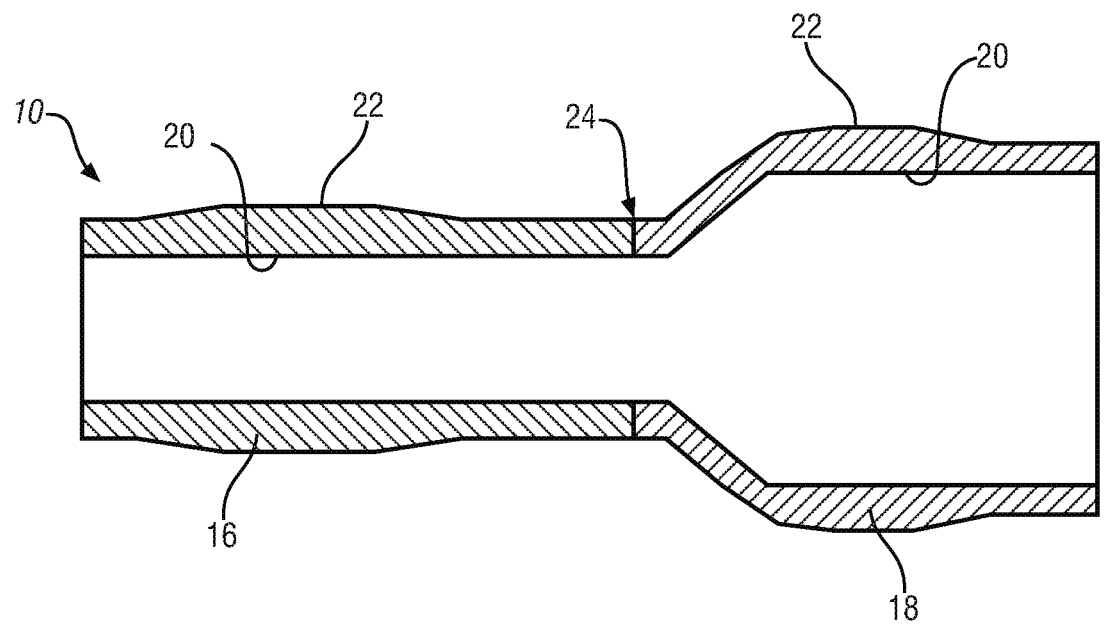
FIG. 2 illustrates a product according to one embodiment of the invention.

Referring to FIG. 2, another embodiment includes a method of making the tubular member 10 having variable wall thickness, wherein the tubular member 10 (shown in cross-section) includes at least a first portion of tubing 16 and a second portion of tubing 18. The first tubular portion 16 and the second tubular portion 18 may include different materials or they may include the same material. The material of at least one of the first tubular portion 16 or the second tubular portion 18 may include any of the metals described above with respect to the first and second materials. For example, in one embodiment the first tubular portion 16 may include magnesium and the second tubular portion 18 may include aluminum. In another embodiment, at least one of the tubular portions 16 or 18 may include steel or titanium. In one embodiment, the tubular portions 16 and 18 may have different inner diameters 20 or they may have different outer diameters 22. In other embodiments, the tubular member 10 may include more than two portions of tubing and/or more than two different materials.

In one embodiment, the tubular member 10 may include first and second materials, and the tubular member may be joined to another component comprising a third material such that the second material galvanically isolates the first material from the third material.

One embodiment may include friction welding the first tubular portion 16 and the second tubular portion 18 at an interface or joint 24. Friction welding may include friction spin welding. In one embodiment, friction spin welding may include holding the first tubular portion 16 stationary and rotating the second tubular portion 18 in contact with the first tubular portion 16 at the joint 24. In one embodiment, there may be no melting at the joint 24, and the intense heat and pressure at the joint 24 may co-mingle the materials of the first tubular portion 16 and the second tubular portion 18. Friction spin welding may result in solid state interdiffusion of the materials of the first and second tubular portions 16, 18, or an admixture of the materials through heavy localized plastic deformation. The first and second tubular portions 16, 18 may be bonded together and the joint 24 may be essentially contiguous. In one embodiment, the joint 24 may be practically invisible when the resulting tubular member 10 is polished.

Figure 3:
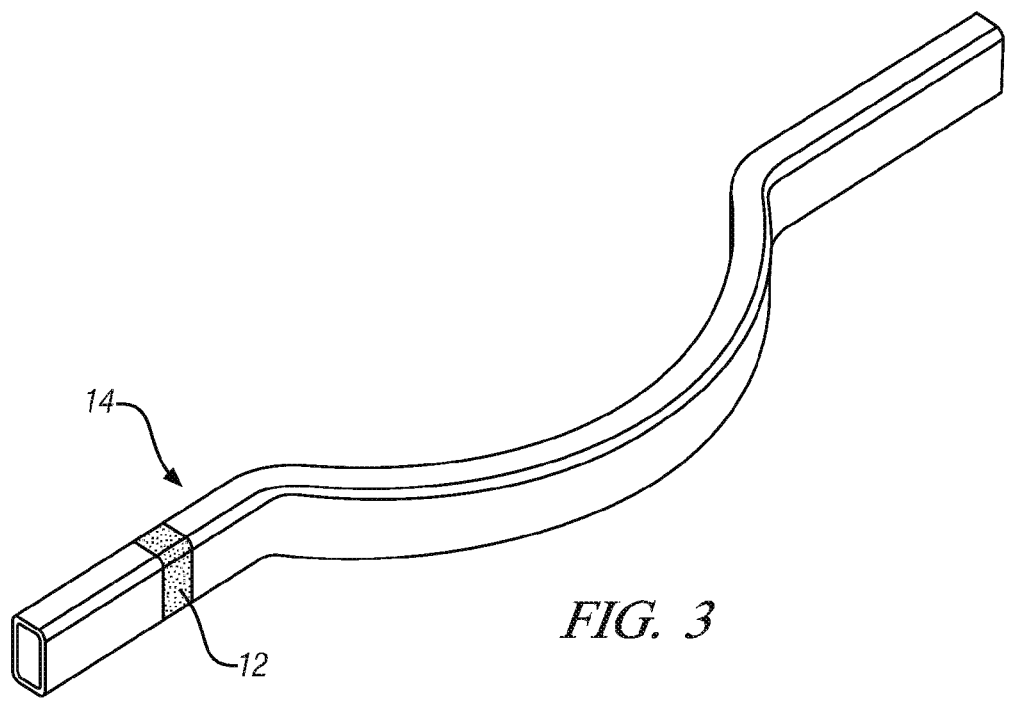
FIG. 3 illustrates a product according to one embodiment of the invention.
Figure 4:
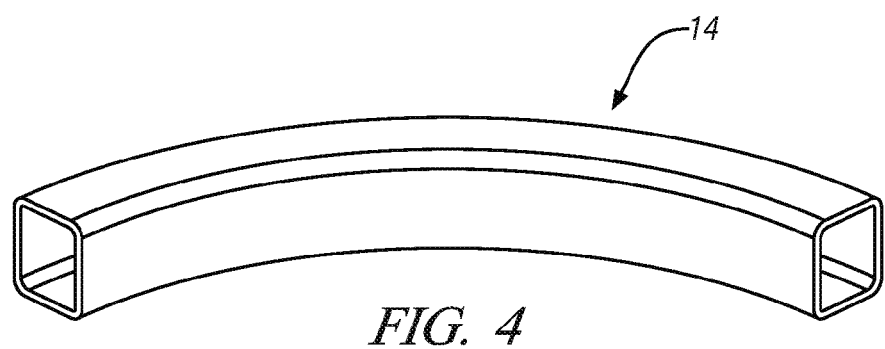
FIG. 4 illustrates a product according to one embodiment of the invention.
Figure 5:
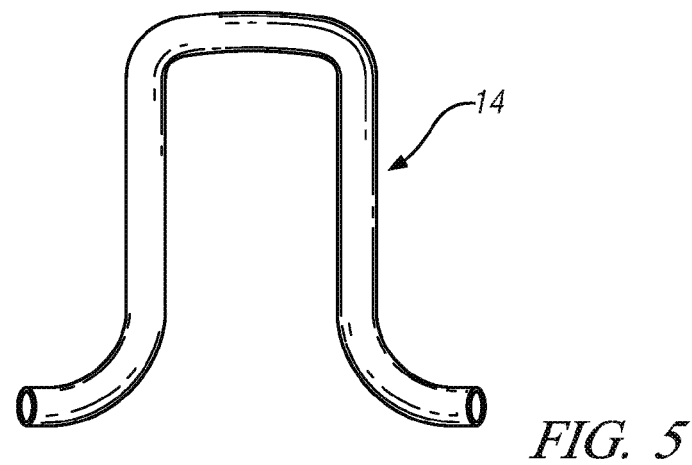
FIG. 5 illustrates a product according to one embodiment of the invention.

In one embodiment, after the tubular member 10 having a variable wall thickness is produced, the tubular member 10 is then bent. In one embodiment, the bending may include using a computer-numerical-control (CNC) bender. In various embodiments, other manual benders with or without inner mandrels may be used. For example, the bender may include a mandrel tubing bender with simple mechanical controls. After bending, the tubular member 10 may be hydroformed into a part 14. Referring to FIG. 3, the part 14 may include a frame rail. In other embodiments, the part 14 may include, but is not limited to, a bumper beam as shown in FIG. 4 or an engine cradle as shown in FIG. 5. In other embodiments, the part 14 may include any part that includes a tubular section.

The part 14 having variable thickness may have a reduced mass. In one embodiment, hydroforming the tubular member 10 may include placing the tubular member 10 between a pair of dies. The dies provide a cavity around the tubular member 10 which has an interior shape matching the exterior shape desired for the part 14. Then, the ends of the tubular member 10 may be sealed and the tubular member may be internally pressurized using water or other fluid to expand it into the shape of the cavity to form the hydroformed part 14.

Referring to FIG. 3, in one embodiment the part 14 may include the crush initiator 12 to control energy absorption when the part 14 is crushed along the axial dimension, for example when the part 14 is a frame rail involved in a car crash. In another embodiment, the part 14 may have corrosion isolation capability. For example, aluminum may be used to insulate a material such as magnesium from contact with another material such as steel for galvanic corrosion resistance. In another embodiment, a more easily crushed material may be combined with a more crush resistant material for improved crash performance.

The above description of embodiments of the invention is merely exemplary in nature and, thus, variations thereof are not to be regarded as a departure from the spirit and scope of the invention.

What is claimed is:

1. A method comprising:
   providing a contiguous tubular member comprising at least a first tube portion comprising one of a first material or a second material, so that the first tube portion does not include a weld joint along the circumference thereof and has a wall thickness that varies along the length of the tube portion wherein the tubular member comprises the first material and the second material and wherein the first material is galvanically isolated by the second material;
   bending the tubular member; and
   hydroforming the tubular member into a part.

2. A method as set forth in claim 1 wherein at least one of the first material or the second material comprises at least one of aluminum, magnesium, steel, titanium, or alloys thereof.

3. A method as set forth in claim 1 wherein providing the tubular member comprises providing the first tube portion comprising at least one of tube spinning or extrusion with a movable mandrel.

4. A method as set forth in claim 1 wherein providing the tubular member comprises providing a sheet having a thickness that varies, roll forming the sheet into a tube-like structure, and seam welding the tube-like structure to form the first tube portion, wherein seam welding comprises at least one of induction welding, friction stir welding, or laser welding.

5. A method as set forth in claim 1 wherein bending the tubular member comprises using a computer-numerical-control (CNC) bender.

6. A method as set forth in claim 1 wherein at least one of an outer diameter or an inner diameter of the tubular member varies along the length of the tubular member.

7. A method as set forth in claim 1 wherein the part comprises one of a frame rail, bumper beam, or engine cradle.

8. A method as set forth in claim 1 wherein the wall thickness of the tubular member ranges from about 1 mm to about 10 mm and wherein the minimum internal diameter of the tubular member ranges from about 4 mm to about 300 mm.

9. A method as set forth in claim 1 further comprising forming a crush initiator in the tubular member prior to bending the tubular member, wherein the crush initiator comprises a region wherein the wall of the tubular member is thinner than the walls of adjacent regions.

10. A method comprising:
    providing a tubular member comprising providing at least a first tube portion having a wall thickness that varies along the length of the tube portion and which does not include a weld joint along the circumference thereof and a second tube portion which has a wall thickness that varies along the length of the tube portion and which does not include a weld joint along the circumference thereof, wherein the portions of tubing comprise at least one of a first material or a second material, so that the tubular member has a wall thickness that varies along the length of the tubular member wherein the tubular member comprises the first material and the second material and wherein the first material is galvanically isolated by the second material;

abutting the first tube portion against the second tube portion;

friction spin welding the at least first and second tube portions at the abutment;

bending the tubular member; and hydroforming the tubular member into a part.

11. A method as set forth in claim 10 further comprising connecting the second portion of tubing to a component comprising steel.

12. A method as set forth in claim 10 wherein the tubular member comprises the first material and the second material, and further comprising connecting the tubular member to another component comprising a third material and so that the second material galvanically isolates the first material from the third material.

13. A product comprising:

a first vehicle component comprising at least a first tube portion which has a wall thickness that varies along the length of the tube portion and which does not include a weld joint along the circumference thereof and a second tube portion which has a wall thickness that varies along the length of the tube portion and which does not include a weld joint along the circumference thereof, wherein the portions of tubing comprise at least one of a first material or a second material, and wherein the component has a wall thickness that varies along the length of the component, and wherein the first vehicle component comprises the first material and the second material and wherein the first material is galvanically isolated by the second material.

14. A product as set forth in claim 13 wherein the first tube portion comprises the first material comprising magnesium, and the second tube portion comprises the second material comprising aluminum.

15. A product as set forth in claim 13 further comprising a second vehicle component comprising steel and wherein the second tube portion is connected to the second vehicle component.

16. A product as set forth in claim 13 wherein the wall thicknesses of the first and second tube portions range from about 1 mm to about 10 mm and wherein the minimum internal diameters of the first and second tube portions range from about 4 mm to about 300 mm.

17. A product as set forth in claim 13 wherein at least one of an outer diameter or an inner diameter of the first and second tube portions varies along the length of the first vehicle component.

18. A product as set forth in claim 13 wherein the first vehicle component comprises a crush initiator comprising a region of the first vehicle component wherein the wall is thinner than the walls of the adjacent regions.

19. A product as set forth in claim 18 wherein the thickness of the wall of the crush initiator is about 90% to about 98% of the thickness of the walls of the adjacent regions.

20. A method comprising:

providing a solid contiguous tubular member comprising at least one of a first material and a second material different from the first material, so that the tubular member does not include a weld joint along the length of the tubular member and has a wall thickness that varies along the length of the tubular member wherein the tubular member comprises the first material and the second material and wherein the first material is galvanically isolated by the second material;

bending the tubular member; and hydroforming the tubular member into a part.

21. A method as set forth in claim 20 wherein the first material comprises stainless steel and the second material comprises aluminum.

22. A method as set forth in claim 20 wherein the first material comprises steel and the second material comprises magnesium.

23. A method as set forth in claim 22 wherein the magnesium is galvanically isolated from the steel.

24. A method as set forth in claim 22 further comprising a third material comprising aluminum interposed between the steel and magnesium.

25. A method comprising:

providing a plurality of solid tubular members having walls of different thicknesses, each tubular member having a first end and an opposite second end, wherein each solid tubular member does not include a weld joint along the length of the solid tubular wherein the tubular members comprise a first material and the second material wherein the first material is galvanically isolated by the second material;

welding one end of one solid tubular member to another end of another solid tubular along the circumference of the walls;

bending the tubular member; and hydroforming the tubular member into a part.

26. A method as set forth in claim 25 wherein the one solid tubular member comprises aluminum and the another solid tubular member comprises steel.

27. A method as set forth in claim 25 wherein the one solid tubular member comprises aluminum and the another solid tubular member comprises magnesium.

28. A method as set forth in claim 25 wherein the one solid tubular member comprises aluminum and the another solid tubular member comprises steel, and a third solid tubular member comprise magnesium positioned between the steel and aluminum.

29. A method as set forth in claim 10 wherein the first tube portion and second tube portion have different outer diameters.

* * * * *